United States Patent
Nageshappa et al.

(10) Patent No.: US 8,347,273 B2
(45) Date of Patent: Jan. 1, 2013

(54) TRACING A CALLTREE OF A SPECIFIED ROOT METHOD

(75) Inventors: Prashanth K. Nageshappa, Bangalore (IN); Prasanna K. Kalle, Karnataka (IN); Venkataraghavan Lakshminarayanachar, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 12/248,438

(22) Filed: Oct. 9, 2008

(65) Prior Publication Data

US 2010/0095278 A1    Apr. 15, 2010

(51) Int. Cl.
*G06F 9/44* (2006.01)
*G06F 9/45* (2006.01)

(52) U.S. Cl. ......... 717/133; 717/127; 717/128; 717/157
(58) Field of Classification Search .................. None
See application file for complete search history.

(56) References Cited

U.S. PATENT DOCUMENTS

| | | | |
|---|---|---|---|
| 6,738,965 B1 | 5/2004 | Webster | |
| 7,367,024 B2 * | 4/2008 | Barua et al. | 717/157 |
| 7,376,941 B2 * | 5/2008 | Allen | 717/157 |
| 7,509,632 B2 * | 3/2009 | Boger | 717/133 |
| 7,617,489 B2 * | 11/2009 | Peyton et al. | 717/133 |
| 7,810,079 B2 * | 10/2010 | Cates | 717/133 |
| 7,975,262 B2 * | 7/2011 | Cozmei | 717/128 |
| 8,117,599 B2 * | 2/2012 | Edmark et al. | 717/127 |
| 8,122,438 B2 * | 2/2012 | Cain et al. | 717/130 |
| 8,141,073 B2 * | 3/2012 | Bhandari et al. | 717/174 |
| 2006/0218543 A1 * | 9/2006 | Boger | 717/157 |
| 2006/0242627 A1 * | 10/2006 | Wygodny et al. | 717/128 |
| 2007/0083856 A1 * | 4/2007 | Chilimbi et al. | 717/128 |
| 2009/0007075 A1 * | 1/2009 | Edmark et al. | 717/128 |

OTHER PUBLICATIONS

Grove et al., A framework for call graph construction algorithms, Nov. 2011, 62 pages, <http://delivery.acm.org/10.1145/510000/506316/p685-grove.pdf>.*
Arnold et al., Collecting and Exploiting High-Accuracy Call Graph Profiles in Virtual Machines, Mar. 2005, 12 pages, <http://delivery.acm.org/10.1145/1050000/1048975/22980051.pdf>.*
Graham et al., gprof: a call graph execution profiler, Apr. 2004, 9 pages, <http://delivery.acm.org/10.1145/990000/989401/p49-graham.pdf>.*
Thread-local storage, Wikipedia, the free encyclopedia, http://en.wikipedia.org/wiki/Thread-local_storage, pp. 1-4, Jul. 2008.

(Continued)

*Primary Examiner* — Thuy Dao
(74) *Attorney, Agent, or Firm* — Cuenot, Forsythe & Kim, LLC

(57) ABSTRACT

A specification of a routine name of a root of a call tree and a specification of a desired depth of call tree tracing are obtained. Upon entering a given routine in a program, a determination is made whether the given routine is the root. Responsive to determining that the given one of the routines is the root, trace information for the routine forming the root is output. Furthermore, upon entering a given one of the routines called, directly or indirectly, by the routine forming the root, a determination is made whether the given one of the routines called, directly or indirectly, by the routine forming the root of the call tree is within the desired depth from the routine forming the root of the call tree; and if this is the case, trace information is output for given one of the routines called, directly or indirectly, by the routine forming the root of the call tree.

25 Claims, 6 Drawing Sheets

OTHER PUBLICATIONS

Visual Call Graph using DTrace, Thermal Noise, http://thermalnoise.wordpress.com12007/11/14/visual-call-graph-using-dtrace/, pp. 1-6, Jun. 2008.

The building blocks of the IBM JVM, http://publib.boulder.ibm.com/infocenter/javasdk/v1r4m2/topic/com.Ibm.java.doc.diagnostics.142/html/jvmbuildingblocks.html, pp. 1-2, Jun. 2008.

Calvin Austin, An Introduction to Java Stack Traces, http://java.sun.com/developer/technicaArticles/Programming/Stacktrace/, pp. 1-5, Jul. 1998.

Python Library Reference, 26.10 inspect—Inspect live objects, release 2.5.2, documentation updated on Feb. 21, 2008, http://docs.python.org/lib/module-inspect.html.

Thread (computer science), Wikipedia, the free encyclopedia, http://en.wikipedia.org/wiki/Thread_%28computer_science%29, pp. 1-6, Jun. 2008.

YourKit Java Profiler Features, Java Profiled—.Net Profiler—The profilers for Java and .NET professionals, http://www.yourkit.com/features/index.jsp, pp. 1-53, Jun. 2008.

PERL caller Function, http://www.tutorialspoint.com/cgi-bin/printversion/cgi?tutorial=perl&file=perl_caller.htm. pp. 1, Jun. 2008.

Apple Inc., Instruments User Guide, Tools>Performance, pp. 43-61, Feb. 2008.

\* cited by examiner

FIG. 2

```
1102 — foo(){        1104 — bar(){        1106 — hello(){      1108 — world(){
         |                    |                    |                    |
         |           1106 — hello();      1108 — world();      1110 — print("helloworld");
         |                    |                    |                    |
1112 — p=malloc()              |                    |                    |
         |           1112 — pp=malloc();            }                    }
         |                    |
1104 — bar();                  |
         |                    |
1114 — i=strlen(p);            |
         |           1116 — free(pp);
         |                    |
1116 — free(p);                |
         |                    |
         }                    }
```

```
            1102 — foo(){        1104 — bar(){
                     |                    |
                     |           1106 — hello();
                     |                    |
            1112 — p=malloc()              |
                     |                    |
            1104 — bar();                  |
                     |           1112 — pp=malloc();
            1114 — i=strlen(p);            |
                     |           1202 — foo();
                     |                    |
                     |           1116 — free(pp);
                     |                    |
            1116 — free(p);      1204 — foo();
                     |                    |
                     |           1206 — foo();
                     |                    |
                     }                    }
```

(1200)

TRACING A CALLTREE OF A SPECIFIED ROOT METHOD

FIELD OF THE INVENTION

Embodiments of the invention relates to the electrical, electronic and computer arts, and, more particularly, to software troubleshooting and the like.

BACKGROUND OF THE INVENTION

In order to get trace information from a program for specific method calls, a user defines a selection of methods to be traced. However, if the user wants to trace the call tree of a particular method (that is, all the "branch" & "leaf" methods called by a method of interest), there is currently no easy way to do this.

One current approach is to identify all the branch and leaf methods under the method of interest. Then, set options so as to trace all of these branch and leaf methods. This will result in a trace generated for all the hits of the branch and leaf methods. Depending on the frequency of usage of these methods in the system, most of the hits might not be associated with the method of interest. This will result in a huge amount of trace data, which needs to be filtered in order to get meaningful and/or useful data.

Consider the pseudo-code implementation of a "foo" routine 1100, as depicted in FIG. 2. In order to trace all methods called by foo, enable method tracing of methods foo( ) 1102, bar( ) 1104, hello( ) 1106, world( ) 1108, print( ) 1110, malloc( ) 1112, strlen( ) 1114, and free( ) 1116; for example, by specifying a trace option such as: trace_methods=foo: malloc:strle:free:bar:hello:world:print. Once this method tracing is enabled, all the required trace information will be obtained. However, there will be several irrelevant trace hits for malloc( ), strlen( ), and free( ), depending on the usage of these functions in the software of which foo( ) is a part. Thus, in the current technique, once a method is specified, it will be traced no matter in what context it is called, and no matter what other method calls the specified method.

Accordingly, it will be necessary to process the resultant trace data to filter the unimportant trace hits. Furthermore, this requires understanding of, and source access to, foo( ) and other methods involved, so as to specify all the methods it calls, as they need to be manually specified as trace options.

Note that in some current techniques, an agent performs byte code modification to update code of the methods (which need to be selected by specifying the package to trace, and so on) to include method entry and exit points. A trace is generated for all the invocations of these methods, no matter which routine is calling these methods. This trace is collected and post-processed (filtering out any invocations which are not part of a required call tree) to build call tree information and display it in a required format.

SUMMARY OF THE INVENTION

Principles and embodiments of the invention provide techniques for tracing a call tree of a specified root method. In one aspect, an exemplary method (which can be computer implemented) for call tree tracing in a program having a plurality of routines includes the steps of obtaining a specification of a routine name for one of the routines forming a root of the call tree, and obtaining a specification of a desired depth of the call tree tracing. An additional step includes, upon entering a given one of the routines, determining whether the given one of the routines is the routine forming the root of the call tree. Responsive to determining that the given one of the routines is the routine forming the root of the call tree, additional steps include outputting trace information for the routine forming the root of the call tree; upon entering a given one of the routines called, directly or indirectly, by the routine forming the root of the call tree, determining whether the given one of the routines called, directly or indirectly, by the routine forming the root of the call tree is within the desired depth from the routine forming the root of the call tree; and responsive to determining that the given one of the routines called, directly or indirectly, by the routine forming the root of the call tree is within the desired depth, outputting trace information for the routine forming the root of the call tree. Note that the terminology "method" and "routine" is used interchangeably herein; the terminology "routine" is employed in the claims to reduce confusion that might result in method claims referring to methods.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system/apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may provide one or more technical benefits, such as allowing call tree tracing of a method, without the need to know the implementation details of, or have source code access to, the method for which it is desired to perform the call tree tracing.

These and other features, aspects and advantages of the embodiments of the invention will become apparent from the following detailed description of illustrative embodiments thereof, which is to be read in connection with the accompanying drawings.

BRIEF DESCRIPTION OF THE DRAWINGS

FIG. 2 shows first pseudo-code that may be traced, in accordance with one or more aspects of the invention;

FIG. 3 shows second (recursive) pseudo-code that may be traced, in accordance with one or more aspects of the invention;

DETAILED DESCRIPTION OF PREFERRED EMBODIMENTS

One or more aspects of the embodiments of the invention may be implemented in connection with a computer system including a processor, such as a microprocessor, which is used to run software loaded into memory. The software can be loaded into the memory by various techniques; for example from a removable storage device such as a floppy disc or compact disk read only memory (CD ROM), or over a network such as a local area network (LAN) or telephone modem connection, via a hard disk drive, and so on. More detail is given hereinbelow, with regard to FIG. 7. In a non-limiting example, the computer system runs an operating system (OS), on top of which is provided a Java virtual machine (JVM). The JVM looks like an application to the (native) OS, but in fact functions itself as a virtual operating system, supporting a Java application. A Java application may include multiple threads. In some cases, in a typical server environment, multiple JVMs may be running on a given computer system, each running an application representing, for example, a single database transaction.

Figure 1:
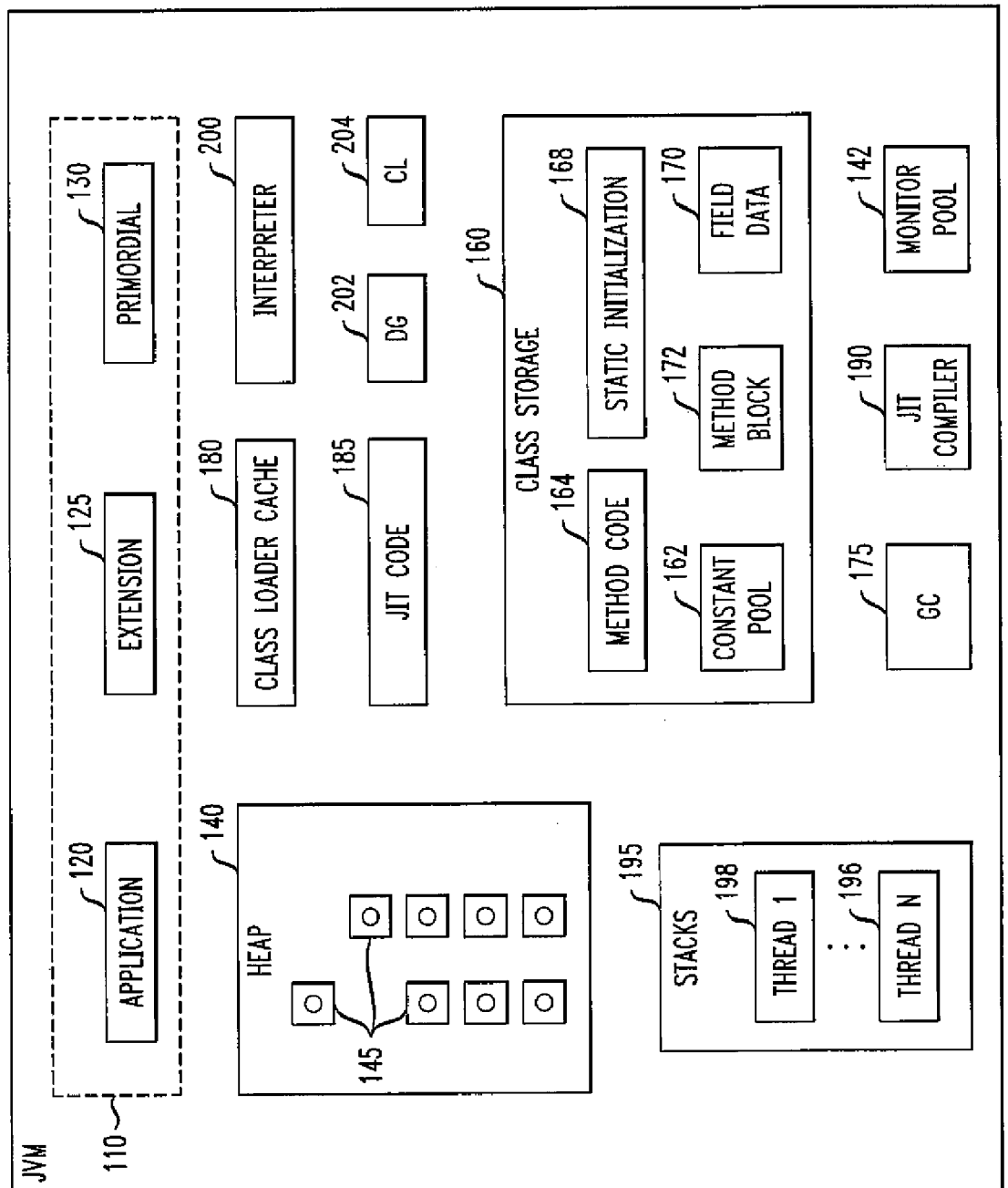
FIG. 1 illustrates some internal components of a Java Virtual Machine (JVM) which can implement one or more embodiments of the invention.

Some instances of the invention are implemented within a virtual machine (VM), such as the JVM. FIG. 1 shows the structure of the JVM 40 in detail (omitting some components which are not directly pertinent to an understanding of the invention). Some of the components shown are written in Java and effectively run within the JVM itself (i.e., are platform independent), while others are typically written in C and so run more as an application on the OS (i.e., are platform dependent). The fundamental unit of a Java program is the class, and thus in order to run any application, the JVM must first load the classes forming and required by that application. For this purpose, the JVM includes a hierarchy of class loaders 110, which conventionally includes three particular class loaders, named Application 120, Extension 125, and Primordial 130. An application can add additional class loaders to the JVM (a class loader is itself effectively a Java program), and these hang off the hierarchy shown in FIG. 1.

The JVM further includes a component CL 204, which also represents a class loader unit, but at a lower level. In other words, this is the component that actually interacts with the operating system to perform the class loading on behalf of the different (Java) class loaders 110.

Note that the JVM specification only requires that classes are loaded before their first active use. Thus the class loader must load the initial class of a program, and all those necessary to run it, but can defer loading any classes called by the initial class until after the initial class has started to run. In practice however, most class loaders attempt to load most of the necessary classes for a program at start-up time.

The JVM also includes a heap 140, which is shared between all threads, and is used for storage of objects 145. Each loaded class represents an object, and therefore can be found on the heap. In Java a class file effectively defines an object, and this is then instantiated one or more times in order to utilize the object. Each such instance is itself an object which can be found in heap 140. Thus the objects 145 shown in the heap in FIG. 1 may represent class files or object instances.

The JVM further includes a class storage area 160, which is used for storing information relating to the class files in the heap 140. This area includes the method code region 164 for storing byte code for implementing class method calls, and a constant pool 162 for storing strings and other constants associated with a class. The class storage area also includes a field data region 170 for sharing static variables (static in this case implies shared between all instances of a class), and an area 168 for storing static initialization methods and other specialized methods (separate from the main method code 164). The class storage area further includes a method block area 172, which is used to stored information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code and the like in class storage area 160. They also contain a reference to the class loader which loaded them into the heap, plus other fields such as a flag to indicate whether or not they have been initialized.

The JVM further includes a storage area for just-in time (JIT) code 185, equivalent to method byte code which has already been compiled into machine code to be run directly on the native platform. This code is created by the JVM from Java byte code by a compilation process using JIT compiler 190 when the application program is started up, and is used to improve run-time performance by avoiding the need for this code to be interpreted later.

Other components of the JVM are the interpreter 200, and stack area 195. The interpreter is responsible for reading in Java byte code form from loaded classes, and converting this into machine instructions for the relevant platform. From the perspective of the application, the interpreter looks like a virtual machine, and cooperates with the stack area, which is used for storing the stacks 196, 198 associated with the execution of different threads on the JVM. Note that because the system libraries and indeed parts of the JVM itself are written in Java, and these frequently use multi-threading, the JVM may be supporting multiple threads even if a user application running on top of the JVM contains only a single thread itself.

Also included within JVM are class loader cache 180 and garbage collection (GC) unit 175. The former is effectively a table used to allow a class loader to trace those classes which it initially loaded into the JVM. Note that it is part of the overall security policy of the JVM that classes will typically have different levels of permission within the system based on the identity of the class loader by which they were originally loaded.

Garbage collection unit 175 is used to delete objects from heap 140 when they are no longer required. Thus in the Java programming language, applications do not need to specifically request or release memory; rather, this is controlled by the JVM itself. Therefore, when Java application 120 creates an object 145, the JVM secures the requisite memory resource. Then, when the Java application finishes using object 145, the JVM can delete the object to free up this memory resource. This latter process is known as garbage collection, and is generally performed by briefly interrupting all threads 196, 198, and scanning the heap 140 for objects which are no longer referenced, and hence can be deleted. The details of garbage collection vary from one JVM implementation to another, but typically GC is scheduled when the heap is nearly exhausted and so there is a need to free up space for new objects.

FIG. 1 also shows a monitor pool 142, which is used for storing a set of locks (monitors) which are used to control contention to an object by different threads at times when exclusive access to the object is required.

The JVM also includes DG, a diagnostic unit 202, which is responsible for the output of trace information, and which can be used to implement all or part of one or more embodiments of the invention.

Various aspects of the embodiments of the invention provide a mechanism which enables a user to specify a call tree to be traced by using a simple trace option. In one or more embodiments, the following simple trace option is employed:

$$\text{trace\_calltree\_root=method\_name1,n1[:method\_name2,n2][:method\_name3,n3]} \quad (1)$$

where:
method_name is the fully qualified name of the method which forms the root of the call tree which it is desired to trace; and n is the depth of the call stack it is desired to trace, starting from the method_name.

In one or more embodiments, if zero, or a negative number, is specified for n, then the complete call stack (call tree) is traced. In normal usage, n is zero or negative, so that the complete call tree is traced. However a limited depth of call tree trace can be requested by setting n equal to a positive integer, to get a higher level understanding of what is happening in a method, and then the tracing can be refined when more information is required. For example, the trace option trace_calltree_root=foo,0 will result in tracing all the functions called by foo( ), but only when they are branches or leaves of a call tree of which foo( ) is a root. In another example, the trace option trace_calltree_root=foo,3 will result in tracing functions called by foo( ), only when they are branches or leaves of a call tree, with a depth of three from foo( ).

One or more embodiments are configured such that trace hits for functions such as malloc( ), strlen( ), and free( ) do not result when they are called from some other areas of code within the same software and/or application, thereby reducing the overhead of processing the resultant trace data to filter the unimportant trace hits.

In one or more embodiments of the invention, every thread has a local flag (for example, calltree_trace) and a local counter (depth) which is employed to achieve the call tree tracing. To start with, "calltree_trace" is set to FALSE and "depth" is set to zero. Upon entry of every method, if "calltree_trace" is TRUE and "depth" is not equal to 0, then trace the method and decrement "depth" if it is positive. It is determined (for example, by parsing the trace options as mentioned above) whether or not a method is included within the selection that is to be call tree traced. If it is included, upon entry of the specified method, "calltree_trace" is set to TRUE and "depth" is set to the value specified. Upon exit from any method, "depth" is incremented only if current "depth" is greater or equal to zero AND the current method was already traced. Upon exit from the root method, "calltree_trace" is set to FALSE and "depth" is set to 0.

By way of example, suppose it is desired to trace, for a depth of two, starting with the root as foo( ). Start with "calltree_trace" set to FALSE and "depth" set to 0. When foo( ) is entered, "calltree_trace" is set to TRUE and "depth" is set to two, and foo( ) is traced. When bar( ) is entered, trace bar( ) and decrease the depth by one. On calling hello( ), reduce the depth further and trace hello( ). Now the depth becomes zero, such that, if any other method was invoked from Hello( ), nothing else would get traced. When returning from Hello( ), increase the depth by one, so that the next sub tree under foo( ) gets traced. Continue in this manner until exiting out of the root method. Upon exiting the root method "calltree_trace" is set to FALSE and "depth" is set to 0.

Since calltree_trace and depth are thread locals, if the required functions are being traced in a thread, and the same functions are hit in other threads (as part of some other call tree), those methods will not be traced. Note that a "function" is the same as a "method" and note also that "thread locals" is a standard terminology referring to variables that are local to a thread.

Consider now the recursive routine 1200 of FIG. 3. Several methods can be employed to address this (recursion) issue. Note that bar( ) 1104 is called within foo( ) 1102, while foo( ) is called in three locations, 1202, 1204, 1206, within the bar( ) routine called by foo( ). In a first exemplary option, the depth counter can be reset whenever the foo( ) method is hit (this option might be made available, for example, as a user-specifiable option). In a second exemplary option, the depth counter need not be reset whenever the foo( ) method is hit; in this case, the total depth to which the technique traces is based on the first invocation of foo( ) in the call stack.

In one or more embodiments, an inventive call tree tracing facility is part of the virtual machine (VM) itself. No additional agent is required, since in this approach, the facility is built into the VM and is usable (for example, by a customer) by simply passing a few additional options to the VM. Advantageously, only invocations which come from the call tree of interest are traced. Thus, there are no issues of redundant trace output, requiring subsequent filtering out. In some instances, one or more inventive techniques provide a "value add" by being included in a VM alongside other tracing facilities. Thus, one or more embodiments of the invention can be implemented as part of the VM; note that aspects of the invention can be used in any product which has a controlled trace engine. A non-limiting example of a suitable environment within which one or more embodiments of the invention can be implemented is the IBM® Java™ Virtual Machine available from International Business Machines Corporation of Armonk, N.Y., USA. IBM is a registered mark of International Business Machines Corporation and Java is a mark of Sun Microsystems, Inc. Non-limiting exemplary elements of a Java VM have been discussed above with regard to FIG. 1. In some instances, there can be embodiments of the invention that work with a controlled trace engine but not within the VM, depending on what the trace engine can do. If the engine has the ability to introduce code into the methods it is trying to trace, then this technique can be used by the trace engine as well.

One or more embodiments of the invention thus provide a method for tracing a call tree of a specified root method in a virtual machine. Advantageously, all the methods in a call tree of a specified root method can be traced, without having to make any modifications to the source code. One or more instances of the invention thus enable the user to trace all the methods in a call tree without having source code or having any knowledge of the source code for which he or she wants to obtain this kind of tracing.

Aspects of the invention may be useful in many different scenarios. For example, suppose a customer complains that a particular third party method performs poorly when used with code of a service provider, and suppose the third party method calls several methods which are part of the service provider's code. The customer may be unwilling to provide information on the third party method, and source code of that method may not be available to the service provider. The service provider may want to know what kinds of methods from the service provider's code are involved in the issue, so as to analyze and address them. With current techniques, the only option available may be to trace all the methods, and filter out methods which were hit after the customer method in question and analyze them further. This may be a tedious task, especially if the environment in which the problem occurred was complex and the number of methods used (and their frequency of use) was very high, leading to a huge amount of traces.

Recall the above example of tracing, with regard to FIG. 1, and consider the following additional example and detail. Specifying:

trace_calltree_root=com.ibm.Test.foo,0 will result in tracing all the functions called by com.ibm.Test.foo( ), but only when they are branches or leaves of a call tree of which foo( ) is a root. Specifying:

trace_calltree_root=com.ibm.Test.foo,3 will result in tracing functions called by com.ibm.Test.foo( ), but only when they are branches or leaves of a call tree, with a depth of three from foo( ).

In one or more embodiments, trace hits do not result for any functions when they are called from some other areas of code within the same software and/or application, thereby, as noted above, reducing the overhead of processing the resultant trace data to filter the unimportant trace hits.

Figure 4:
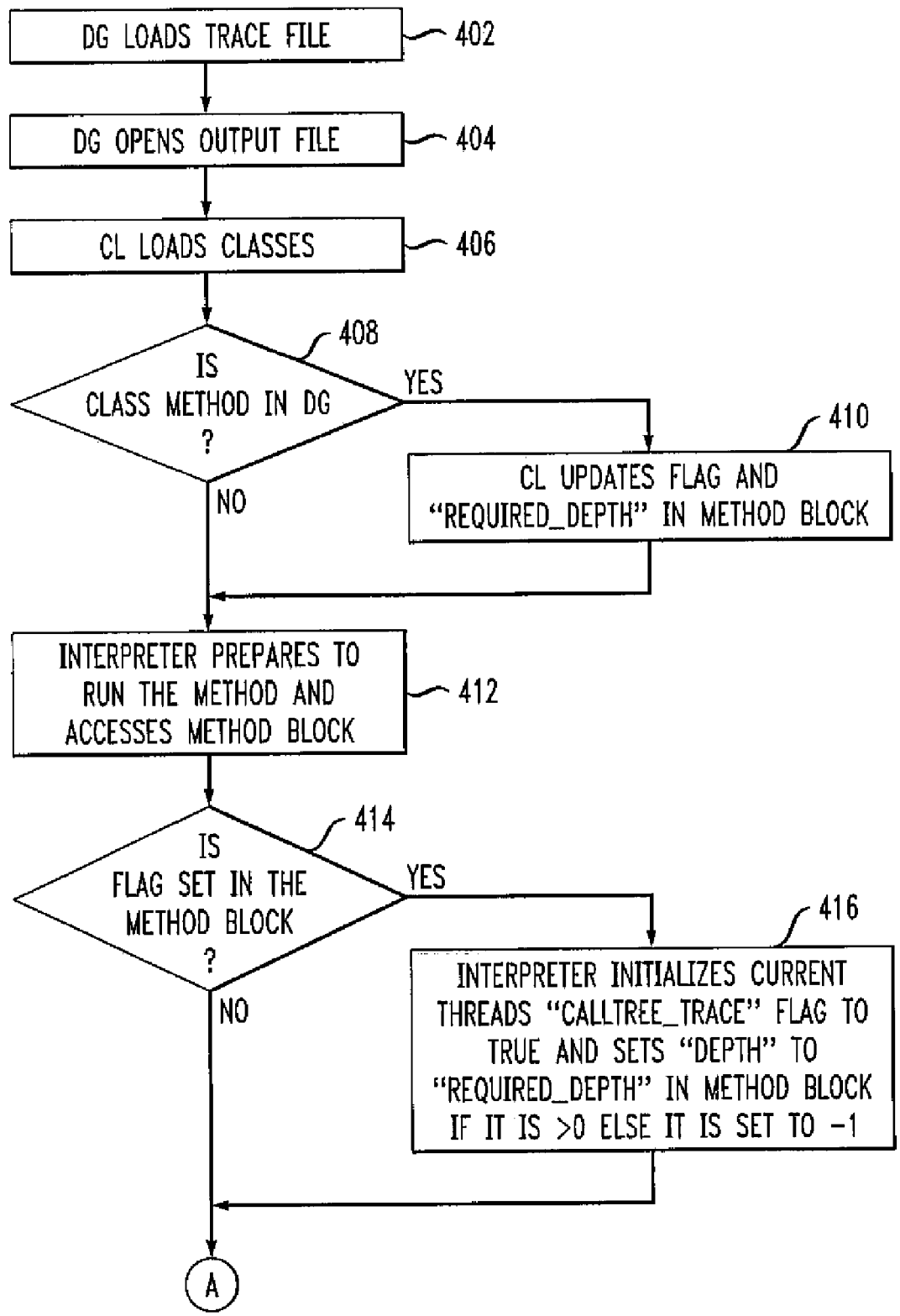
FIGS. 4-6 show a flow chart of exemplary method steps, according to another aspect of the invention.
Figure 5:
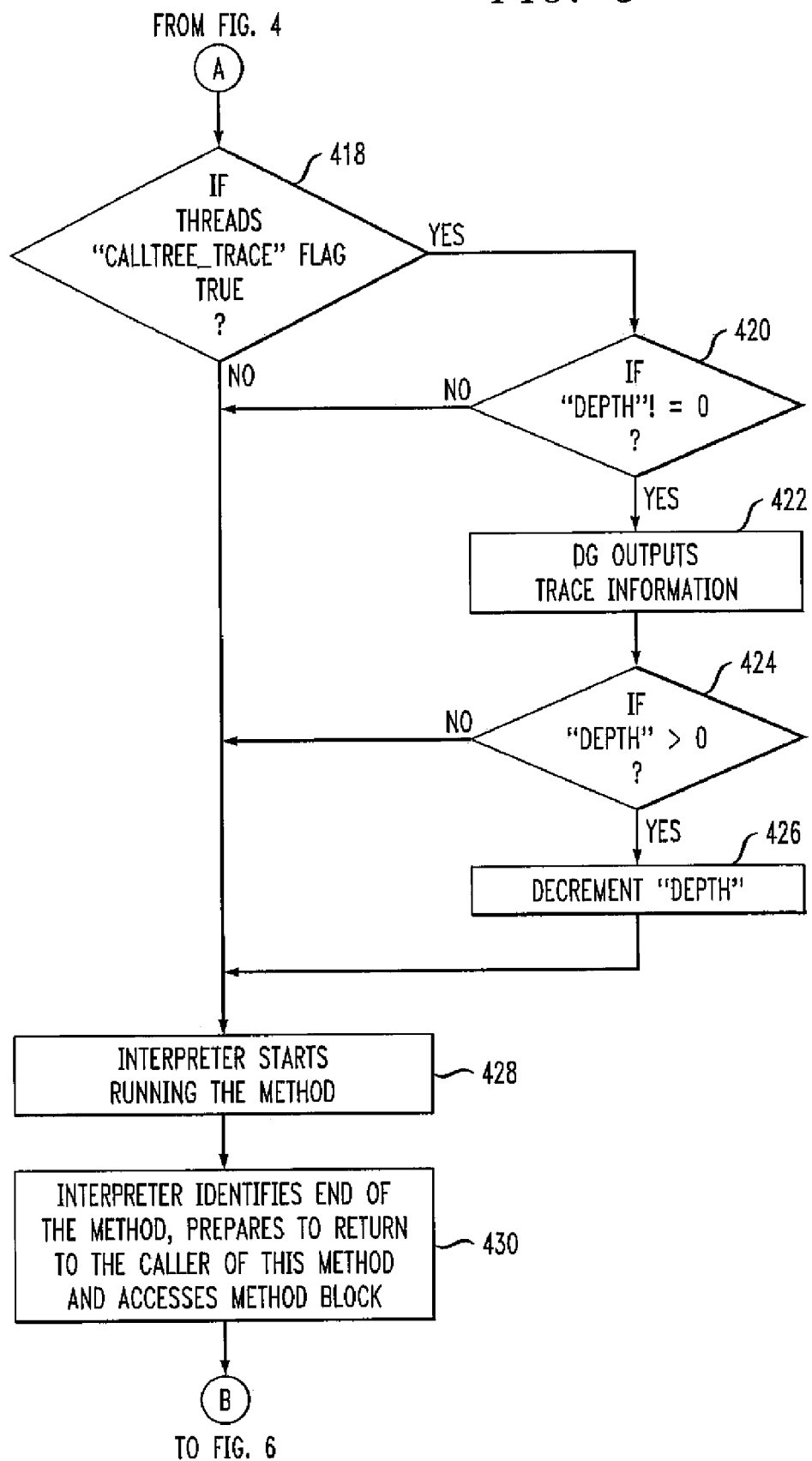
Figure 6:
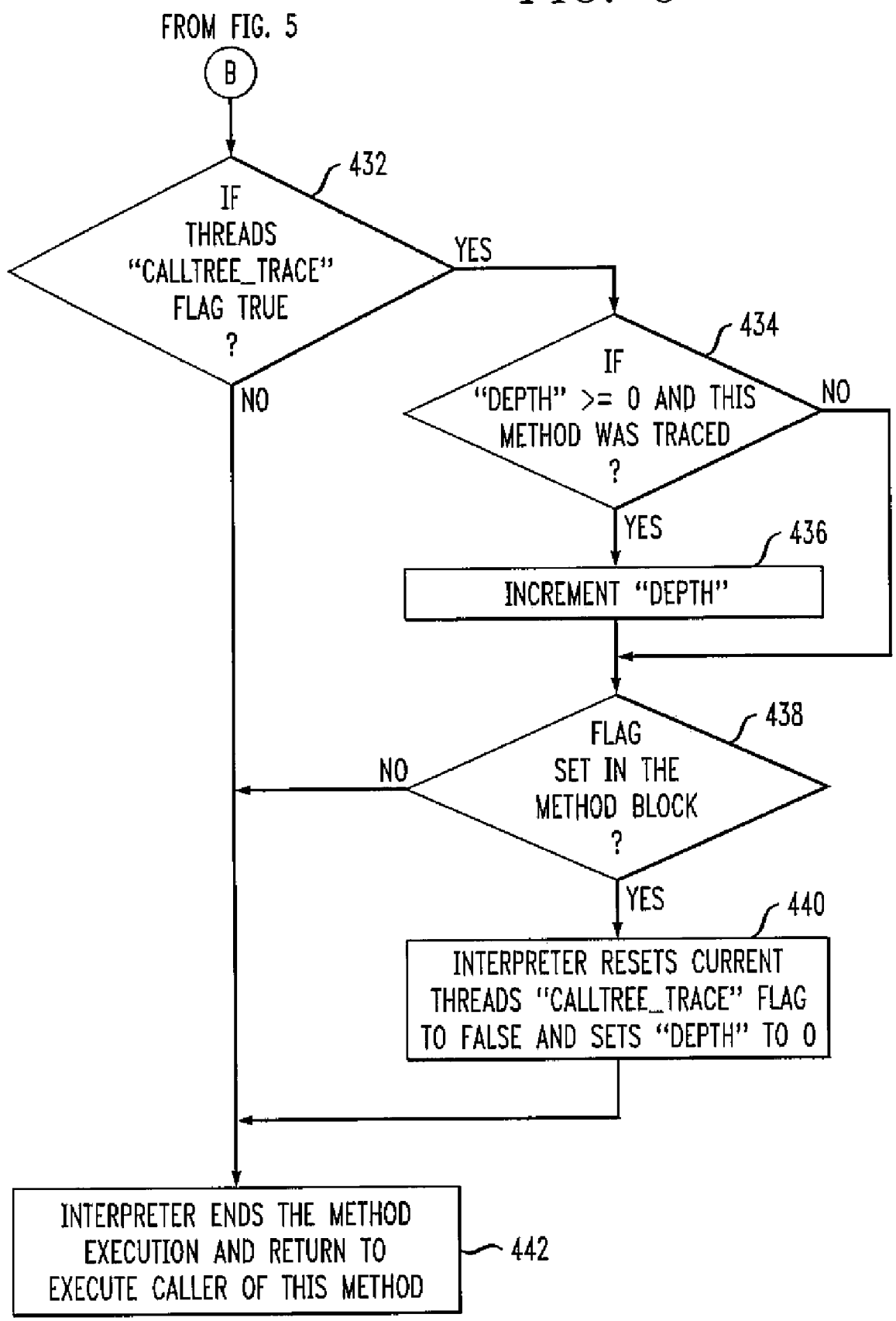

Recall the above exemplary implementation details, and now consider the following additional detail, with reference to the flow chart of FIGS. 4-6. In a VM, a method block is associated with each method and is used by the interpreter to invoke the method. Note that certain elements will be mentioned as carrying out certain method steps, but these references are exemplary and non-limiting. Every thread has a local flag (for example, calltree_trace) and a local counter (depth) which is employed to achieve the call tree tracing. In step 402, the DG 202 loads the trace file, and in step 404, the DG 202 opens an output file. In step 406, CL 204 loads the classes. To start with, "calltree_trace" is set to FALSE and "depth" set to zero. At the start (that is, YES branch of decision block 408), the "trace_calltree_root" option is parsed and a flag is set, and "required_depth" is initialized within the method block associated with the method, as in step 410. The interpreter prepares to run the method and access the method block in step 412 (which is reached directly from the NO branch of block 408, or else from block 410). The status of the flag is checked in block 414, when the interpreter invokes a method to determine whether or not the method is included within the selection. If it is determined that this method is included within the selection to be call tree traced, as per the "YES" branch of block 414, upon entry of the specified method, "calltree_trace" is set to TRUE and "depth" is set to the "required depth" value stored in the method block if required depth is greater than zero, or else set to minus one, as in step 416.

Upon entry of every method, if "calltree_trace" is TRUE (YES branch of block 418) and "depth" is not equal to 0 (YES branch of block 420), then the DG outputs the trace for this method in step 422 and decrements "depth" in block 426 if it is determined to be positive in block 424. Please note, the symbol "!" before the "=" should be read as "not"; therefore block 420 reads "if depth not equal to zero." In the case of the "NO" branch of blocks 418, 420, or 424, and following block 426, the interpreter starts running the method, as per step 428.

In step 430, the interpreter identifies the end of the method, prepares to return to the caller of the method, and accesses the method block 172. Upon exit from any method, if "calltree_trace" is TRUE, as per the "YES" branch of block 432, then "depth" is incremented in block 436 if it is non-negative AND the current method was already traced, as determined in block 434. Upon exit from the root method, with the flag set in the method block 172, as per the YES branch of block 438, "calltree_trace" is set to FALSE and "depth" is set to 0 in block 440. The interpreter ends the method in step 442 and returns to execute the caller of the method. Step 442 is reached directly in the case of the NO branches of blocks 432 and 438.

Consider again the pseudo implementation of foo( ) in FIG. 1. Suppose, as above, it is desired to trace for a depth of two starting with the root as foo( ). Start with "calltree_trace" set to FALSE and "depth" set to zero. The "trace_calltree_root" option is parsed and a flag is set, and "required_depth" is initialized to two within the method block associated with the foo( ) method. When foo( ) is entered, the status of this flag is checked and found to be set; hence, "calltree_trace" is set to TRUE and "depth" is copied from the "required_depth" value stored in the method block of foo( ). When bar( ) is entered, trace bar( ) and decrease the depth by one. On calling hello( ), reduce depth further and trace hello( ). Now the depth becomes zero. Thus, if any other method is invoked from hello( ), nothing else is traced. When returning from hello( ), increase the depth by one, so that the next sub tree under foo( ) gets traced. Continue in this manner till exiting out of the root method. Upon exiting root method, "calltree_trace" is set to FALSE and "depth" is set to zero.

It will be appreciated that various aspects of the embodiments of the invention may provide benefits such as avoiding need to modify source code and/or add additional code, reduced turnaround time compared to current techniques, and avoiding need to access source code (which may not be available). Reduced turnaround time may be available, for instance, by avoiding steps such as analysis, followed by modifying code, followed by deploying the new code, followed by collecting data, followed by further analysis, and so on (possibly including, in current approaches, multiple iterations of the preceding chain of events).

In one or more embodiments of the invention, all that is required is to pass a few options, and the VM will be enabled to provide the required information; indeed, knowledge of the code it is desired to trace is not necessarily required, and nevertheless, the required tracing can still be obtained. Since these aspects may be implemented in the VM, and the decision regarding whether to trace or not is based on a flag, little or no penalty is incurred in implementing one or more embodiments of the invention.

Advantageously, one or more embodiments of the invention do not require stopping an application at regular intervals and recording information, or filtering to remove irrelevant data; rather, in one or more embodiments, only the data actually needed is collected, thus resulting in reduced overhead when compared to prior techniques. Furthermore, one or more embodiments of the invention avoid the complexity of instrumentation of the system by instrumentation providers.

Aspects of the invention address RAS (Reliability, Accessibility & Serviceability) and may be included, by way of example and not limitation, in a Java™ developer's toolkit such as the IBM Java Development Kit. The invention is not limited to a Java™ environment, however, and may be used in a variety of settings; for example, other runtime environments such as PHP (PHP Hypertext Preprocessor), the Ruby object-oriented programming language, Python, Perl, Fan, Scala, Groovy, and so on.

In view of the foregoing discussion, it will be appreciated that, in general terms, an exemplary method (which can be computer implemented) for call tree tracing in a program having a plurality of routines, includes the steps, discussed with regard to expression (1) above, of obtaining a specification of a routine name for one of the routines forming a root of the call tree, and obtaining a specification of a desired depth of the call tree tracing. Note that the terminology "method" and "routine" is used interchangeably herein; the terminology "routine" is employed in the and in the next few paragraphs to reduce confusion that might result in a description of claimed methods referring to methods.

Upon entering a given one of the routines, the system determines whether the given one of the routines is the routine forming the root of the call tree (first "YES" branch from block 414), and responsive to determining that the given one of the routines is the routine forming the root of the call tree, the system outputs trace information for the routine forming the root of the call tree, at step 422.

Upon entering a given one of the routines called, directly or indirectly, by the routine forming the root of the call tree, the system determines whether the given one of the routines called, directly or indirectly, by the routine forming the root of the call tree is within the desired depth from the routine forming the root of the call tree, as per decision block 420. Responsive to determining that the given one of the routines called, directly or indirectly, by the routine forming the root of the call tree is within the desired depth, the system outputs trace information for the given one of the routines called, directly or indirectly, by the routine forming the root of the call tree, as at step 422.

Advantageously, in one or more embodiments, the steps are carried out substantially without access to source code of the program.

As shown at the "NO" branch of block 420, an additional step can include, responsive to determining that the given one of the routines called, directly or indirectly, by the routine forming the root of the call tree is not within the desired depth, not outputting trace information for the routine forming the root of the call tree.

As noted, in some instances, tracing can be carried out to an unlimited depth when the desired depth is specified as at least one predetermined value, for example, when n is zero and/or negative. An additional step can include keeping track of whether the given one of the routines called, directly or indirectly, by the routine forming the root of the call tree is within the desired depth by employing a counter, such as "depth" discussed with regard to the flow chart of FIGS. 4-6. Further steps can include decrementing the counter upon entry to the given one of the routines called, directly or indirectly, by the routine forming the root of the call tree, as per step 426; and incrementing the counter upon exit from the given one of the routines called, directly or indirectly, by the routine forming the root of the call tree, as per step 436.

As noted above, several methods can be employed to address the recursive routine 1200 of FIG. 3 (wherein the routine forming the root of the call tree is called by one of the given ones of the routines called, directly or indirectly, by the routine forming the root of the call tree, as part of a recursion). In the aforementioned first exemplary option, the depth counter can be reset whenever the root method is hit (this option might be made available, for example, as a user-specifiable option). Thus, an additional optional step in this case would be re-setting the counter whenever the routine forming the root of the call tree is hit during the recursion (that is, initialize as per block 416 whenever entering the root, either the first time or during one of the recursive calls).

In the aforementioned second exemplary option, the depth counter need not be reset whenever the root method is hit; in this case, the total depth to which the technique traces is based on the first invocation of the root method in the call stack. In this case, an additional step includes not re-setting the counter (for example, as was done above in block 416) whenever the routine forming the root of the call tree is hit during the recursion, such that the total depth to which the technique traces is based on the desired depth measured from a first invocation of the root routine.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 7:
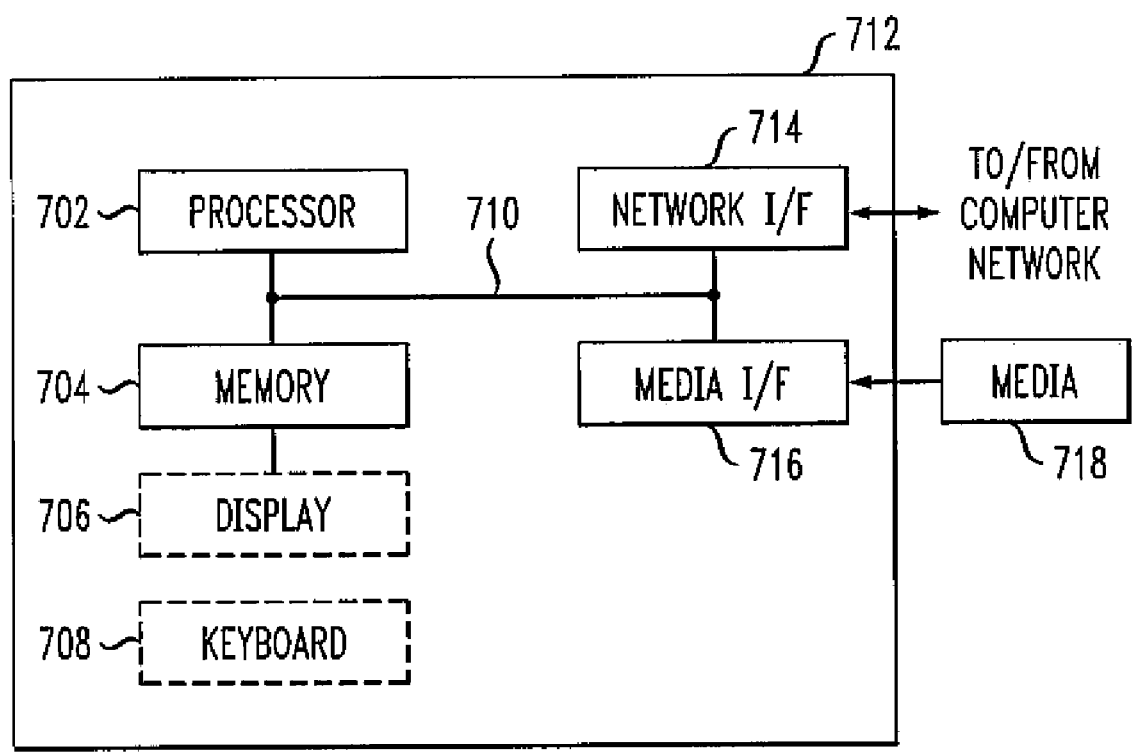
FIG. 7 depicts a computer system that may be useful in implementing one or more aspects and/or elements of the invention.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. In connection with FIG. 7, the term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718. FIG. 7 is illustrative of the servers and other computers mentioned herein.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, embodiments of the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device). Examples of a computer-readable medium include a semiconductor or solid-state memory (for example memory 704), magnetic tape, a removable computer diskette (for example media 718), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. In a typical implementation, the code implementing one or more embodiments of the invention is part of the JVM, and runs on the same machine as the JVM, with the applications it is desired to analyze.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated herein may be implemented in various forms of hardware, software, or combinations thereof, for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the embodiments of the invention described above can be implemented in a number of different fashions. Given the teachings provided herein, one of ordinary skill in the related art will be able to contemplate other implementations. Indeed, although illustrative embodiments of the present invention have been described herein with reference to the accompanying drawings, it is to be understood that embodiments of the invention are not strictly limited to those precise embodiments disclosed, and that various other changes and modifications may be made by one skilled in the art without departing from the scope or spirit of the invention.

What is claimed is:

1. A method for call tree tracing in a program having a plurality of routines, the method comprising the steps of:
   obtaining a specification of a routine name for one of the routines forming a root of the call tree;
   obtaining a specification of a desired depth of the call tree tracing;
   upon entering a given one of the routines, determining whether the given one of the routines is the routine forming the root of the call tree; and
   responsive to determining that the given one of the routines is the routine forming the root of the call tree:
   outputting trace information for the routine forming the root of the call tree;
   upon entering a given one of the routines called, directly or indirectly, by the routine forming the root of the call tree, determining whether the given one of the routines called, directly or indirectly, by the routine forming the root of the call tree is within the desired depth from the routine forming the root of the call tree; and
   responsive to determining that the given one of the routines called, directly or indirectly, by the routine forming the root of the call tree is within the desired depth, outputting trace information for the given one of the routines called, directly or indirectly, by the routine forming the root of the call tree.

2. The method of claim 1, wherein the steps are carried out substantially without access to source code of the program.

3. The method of claim 1, further comprising the additional step of, responsive to determining that the given one of the routines called, directly or indirectly, by the routine forming the root of the call tree is not within the desired depth, not outputting trace information for the routine forming the root of the call tree.

4. The method of claim 1, further comprising the additional step of tracing to an unlimited depth when the desired depth is specified as at least one predetermined value.

5. The method of claim 1, further comprising the additional step of keeping track of whether the given one of the routines called, directly or indirectly, by the routine forming the root of the call tree is within the desired depth by employing a counter.

6. The method of claim 5, further comprising the additional steps of:
decrementing the counter upon entry to the given one of the routines called, directly or indirectly, by the routine forming the root of the call tree; and
incrementing the counter upon exit from the given one of the routines called, directly or indirectly, by the routine forming the root of the call tree.

7. The method of claim 6, wherein the routine forming the root of the call tree is called by one of the given ones of the routines called, directly or indirectly, by the routine forming the root of the call tree, as part of a recursion, further comprising the additional step of re-setting the counter whenever the routine forming the root of the call tree is hit during the recursion.

8. The method of claim 6, wherein the routine forming the root of the call tree is called by one of the given ones of the routines called, directly or indirectly, by the routine forming the root of the call tree, as part of a recursion, further comprising the additional step of not re-setting the counter whenever the routine forming the root of the call tree is hit during the recursion, whereby a total depth to which the method traces is based on the desired depth measured from a first invocation of the routine forming the root of the call tree.

9. A computer program product comprising a computer useable storage medium having stored therein computer usable program code for call tree tracing in a program having a plurality of routines, the computer program product including:
computer usable program code for obtaining a specification of a routine name for one of the routines forming a root of the call tree;
computer usable program code for obtaining a specification of a desired depth of the call tree tracing;
computer usable program code for, upon entering a given one of the routines, determining whether the given one of the routines is the routine forming the root of the call tree; and
computer usable program code for, responsive to determining that the given one of the routines is the routine forming the root of the call tree:
outputting trace information for the routine forming the root of the call tree;
upon entering a given one of the routines called, directly or indirectly, by the routine forming the root of the call tree, determining whether the given one of the routines called, directly or indirectly, by the routine forming the root of the call tree is within the desired depth from the routine forming the root of the call tree; and
responsive to determining that the given one of the routines called, directly or indirectly, by the routine forming the root of the call tree is within the desired depth, outputting trace information for the given one of the routines called, directly or indirectly, by the routine forming the root of the call tree.

10. The computer program product of claim 9, wherein the steps are carried out by the computer usable program code substantially without access to source code of the program.

11. The computer program product of claim 9, further comprising computer usable program code for, responsive to determining that the given one of the routines called, directly or indirectly, by the routine forming the root of the call tree is not within the desired depth, not outputting trace information for the routine forming the root of the call tree.

12. The computer program product of claim 9, further comprising computer usable program code for tracing to an unlimited depth when the desired depth is specified as at least one predetermined value.

13. The computer program product of claim 9, further comprising computer usable program code for keeping track of whether the given one of the routines called, directly or indirectly, by the routine forming the root of the call tree is within the desired depth by employing a counter.

14. The computer program product of claim 13, further comprising computer usable program code for:
decrementing the counter upon entry to the given one of the routines called, directly or indirectly, by the routine forming the root of the call tree; and
incrementing the counter upon exit from the given one of the routines called, directly or indirectly, by the routine forming the root of the call tree.

15. The computer program product of claim 14, wherein the routine forming the root of the call tree is called by one of the given ones of the routines called, directly or indirectly, by the routine forming the root of the call tree, as part of a recursion, further comprising computer usable program code for re-setting the counter whenever the routine forming the root of the call tree is hit during the recursion.

16. The computer program product of claim 14, wherein the routine forming the root of the call tree is called by one of the given ones of the routines called, directly or indirectly, by the routine forming the root of the call tree, as part of a recursion, further comprising computer usable program code for not re-setting the counter whenever the routine forming the root of the call tree is hit during the recursion, whereby a total depth to which the method traces is based on the desired depth measured from a first invocation of the routine forming the root of the call tree.

17. A system for call tree tracing in a program having a plurality of routines, the system comprising:
a memory; and
at least one processor, coupled to the memory, and operative to obtain a specification of a routine name for one of the routines forming a root of the call tree;
obtain a specification of a desired depth of the call tree tracing;
upon entering a given one of the routines, determine whether the given one of the routines is the routine forming the root of the call tree; and
responsive to determining that the given one of the routines is the routine forming the root of the call tree:
output trace information for the routine forming the root of the call tree;

upon entering a given one of the routines called, directly or indirectly, by the routine forming the root of the call tree, determine whether the given one of the routines called, directly or indirectly, by the routine forming the root of the call tree is within the desired depth from the routine forming the root of the call tree; and responsive to determining that the given one of the routines called, directly or indirectly, by the routine forming the root of the call tree is within the desired depth, output trace information for the given one of the routines called, directly or indirectly, by the routine forming the root of the call tree.

18. The system of claim 17, wherein the steps are carried out substantially without access to source code of the program.

19. The system of claim 17, further comprising the additional step of, responsive to determining that the given one of the routines called, directly or indirectly, by the routine forming the root of the call tree is not within the desired depth, not outputting trace information for the routine forming the root of the call tree.

20. The system of claim 17, further comprising the additional step of tracing to an unlimited depth when the desired depth is specified as at least one predetermined value.

21. The system of claim 17, further comprising the additional step of keeping track of whether the given one of the routines called, directly or indirectly, by the routine forming the root of the call tree is within the desired depth by employing a counter.

22. The system of claim 21, further comprising the additional steps of:
   decrementing the counter upon entry to the given one of the routines called, directly or indirectly, by the routine forming the root of the call tree; and
   incrementing the counter upon exit from the given one of the routines called, directly or indirectly, by the routine forming the root of the call tree.

23. The system of claim 22, wherein the routine forming the root of the call tree is called by one of the given ones of the routines called, directly or indirectly, by the routine forming the root of the call tree, as part of a recursion, further comprising the additional step of re-setting the counter whenever the routine forming the root of the call tree is hit during the recursion.

24. The system of claim 22, wherein the routine forming the root of the call tree is called by one of the given ones of the routines called, directly or indirectly, by the routine forming the root of the call tree, as part of a recursion, further comprising the additional step of not re-setting the counter whenever the routine forming the root of the call tree is hit during the recursion, whereby a total depth to which the method traces is based on the desired depth measured from a first invocation of the routine forming the root of the call tree.

25. A system for call tree tracing in a program having a plurality of routines, the system comprising:
   a processor;
   means for obtaining a specification of a routine name for one of the routines forming a root of the call tree;
   means for obtaining a specification of a desired depth of the call tree tracing;
   means for, upon entering a given one of the routines, determining whether the given one of the routines is the routine forming the root of the call tree; and
   means for, responsive to determining that the given one of the routines is the routine forming the root of the call tree:
   outputting trace information for the routine forming the root of the call tree;
   upon entering a given one of the routines called, directly or indirectly, by the routine forming the root of the call tree, determining whether the given one of the routines called, directly or indirectly, by the routine forming the root of the call tree is within the desired depth from the routine forming the root of the call tree; and
   responsive to determining that the given one of the routines called, directly or indirectly, by the routine forming the root of the call tree is within the desired depth, outputting trace information for the given one of the routines called, directly or indirectly, by the routine forming the root of the call tree.

* * * * *